United States Patent
Brown et al.

(10) Patent No.: US 9,447,689 B2
(45) Date of Patent: Sep. 20, 2016

(54) METHOD OF REPAIRING A TURBINE NOZZLE SEGMENT IN A TURBINE ENGINE

(75) Inventors: Nathaniel Patrick Brown, Cincinnati, OH (US); Glenn Knight, Mason, OH (US); Wayne Grady, Morgan Township, OH (US); Michael Steckler, Miami Township, OH (US)

(73) Assignee: General Electric Company, Schenectady, NY (US)

( * ) Notice: Subject to any disclaimer, the term of this patent is extended or adjusted under 35 U.S.C. 154(b) by 623 days.

(21) Appl. No.: 13/163,474

(22) Filed: Jun. 17, 2011

(65) Prior Publication Data

US 2012/0317809 A1    Dec. 20, 2012

(51) Int. Cl.
*F01D 5/00* (2006.01)
*B23P 6/00* (2006.01)
*F01D 9/02* (2006.01)
*F01D 9/04* (2006.01)

(52) U.S. Cl.
CPC ............... *F01D 5/005* (2013.01); *B23P 6/002* (2013.01); *F01D 9/02* (2013.01); *F01D 9/047* (2013.01); *Y02T 50/673* (2013.01); *Y10T 29/49318* (2015.01)

(58) Field of Classification Search
CPC .......... F01D 5/005; F01D 9/047; F01D 9/02; B23P 6/002
USPC ....................................................... 29/889.1
See application file for complete search history.

(56) References Cited

U.S. PATENT DOCUMENTS

| | | | |
|---|---|---|---|
| 5,797,725 A | 8/1998 | Rhodes | |
| 6,354,797 B1 | 3/2002 | Heyward et al. | |
| 6,416,278 B1 * | 7/2002 | Caddell et al. | 415/191 |
| 6,579,061 B1 | 6/2003 | Heyward et al. | |
| 6,793,457 B2 | 9/2004 | Caddell et al. | |
| 6,905,308 B2 * | 6/2005 | Hagle et al. | 415/209.4 |
| 7,185,433 B2 * | 3/2007 | Miller et al. | 29/889.22 |
| 2003/0106215 A1 * | 6/2003 | Heyward et al. | 29/889.1 |
| 2004/0064930 A1 * | 4/2004 | Gunn et al. | 29/421.1 |
| 2004/0096322 A1 * | 5/2004 | Caddell et al. | 415/210.1 |
| 2006/0104810 A1 | 5/2006 | Hagle et al. | |
| 2007/0147991 A1 | 6/2007 | Dasilva et al. | |
| 2008/0273971 A1 | 11/2008 | Grady et al. | |
| 2010/0050434 A1 * | 3/2010 | Long | 29/889.1 |
| 2012/0317809 A1 * | 12/2012 | Brown et al. | 29/889.1 |

FOREIGN PATENT DOCUMENTS

| | | |
|---|---|---|
| JP | 2002138802 A | 5/2002 |
| JP | 2003106104 A | 4/2003 |
| JP | 2006144784 A | 6/2006 |
| JP | 2007182877 A | 7/2007 |
| JP | 2008215353 A | 9/2008 |
| JP | 2010180827 A | 8/2010 |

OTHER PUBLICATIONS

Unofficial English Translation of Japanese Office Action issued in connection with corresponding JP Application No. 2012134321 on Mar. 22, 2016.

* cited by examiner

*Primary Examiner* — Jacob Cigna
(74) *Attorney, Agent, or Firm* — General Electric Company; Pamela A. Kachur (57) ABSTRACT

A method for repairing a turbine nozzle having at least one vane disposed between an inner and an outer band. Embodiments of the method can comprise separating the inner band from the outer band and securing a replacement part to the inner band. In one embodiment, the methods accommodate replacement parts that include vanes with a base feature that comprises a non-airfoil shape and that integrates cooling features useful for operation of the turbine nozzle.

4 Claims, 6 Drawing Sheets

METHOD OF REPAIRING A TURBINE NOZZLE SEGMENT IN A TURBINE ENGINE

BACKGROUND

1. Technical Field

The subject matter disclosed herein relates generally to gas turbine engines and, more particularly, to repair of turbine nozzle segments found in gas turbine engines such as aircraft engines.

2. Description of Related Art

A gas turbine engine includes a compressor that pressurizes air and delivers the pressurized air to a combustor. In the combustor, the air mixes with fuel and ignites to generate hot combustion gases. The combustion gases flow downstream to a turbine section, which transforms energy of the combustion gas flow to power the compressor and to provide useful work. An example of such gas turbine engines is an aircraft engine that can power an aircraft in flight.

Aircraft engines may include stationary turbine nozzles that modify the gas flow and pressure within the turbine section. These changes can enhance engine performance. In one example, the aircraft engine has multiple turbine sections (or "stages"), where turbine nozzles channel the combustion gases that enter each turbine stage into a turbine rotor that is downstream of the turbine nozzle.

Turbine nozzles may comprise multiple segments that annularly bound the periphery of the turbine section. Each of the segments may have one or more vanes, which extend radially between arcuate bands that define a path through which the hot combustion gases flow. In one example, the segments mount to the engine casing in an annular array between the rotor blades of adjacent stages.

Operation of the aircraft engine exposes the turbine nozzles (and, accordingly, the nozzle segments) to a gas stream with properties (e.g., temperature) that can limit the effective service life of these components. Accordingly, the nozzle segments may comprise certain materials such as high temperature cobalt or nickel-based superalloys and may have coatings that comprise corrosion and/or heat resistant materials. In some cases, the aircraft engine may direct cooling air from the compressor onto the nozzle segments to prolong service life. However, even with such efforts, portions of the nozzle segments, particularly the vanes, can crack, corrode, and otherwise degrade. Such deterioration may require service to repair or to replace one or more of the nozzle segments to maintain safe and efficient operation.

The turbine nozzles are complex and intricate elements of the turbine engine. These elements are often made of relatively expensive materials, and may be expensive to manufacture. Thus, repair of the turbine nozzles is favored whenever possible. Some repairs focus on the cracks and restore the dimensional integrity of the vanes. Local distortion and under minimum wall thicknesses may reduce the success of these repairs, however, particularly when the problematic vane is subject to multiple repair processes. Often damage to the turbine nozzles prevents repair altogether.

BRIEF DESCRIPTION OF THE INVENTION

Repair and maintenance procedures are important to the operational lifetime of turbine engines, e.g., aircraft engines. The present disclosure describes various methods that focus on repair of turbine nozzles, which are useful for directing air through these turbine engines. The methods include modifying the turbine nozzle to remove parts of the turbine nozzle that may exhibit signs of damage, weakness, and wear. In one example, the method includes replacing portions of the turbine nozzle with a replacement part.

The methods described below can apply to turbine nozzles with configurations important to the operation of the turbine nozzle and the turbine engine as a whole. These configurations may integrate, for example, certain cooling features into the overall construction of the turbine nozzle. Because these cooling features rely, at least in part, on the entire construction of the turbine nozzle, repair is often more difficult. On the other hand, implementation of embodiments of the methods described herein can maintain the overall function of such cooling features while still returning the turbine nozzle to good working order.

BRIEF DESCRIPTION OF THE DRAWINGS

Reference is now made briefly to the accompanying drawings, in which.

Where applicable like reference characters designate identical or corresponding components and units throughout the several views.

DETAILED DESCRIPTION OF THE INVENTION

Figure 1:
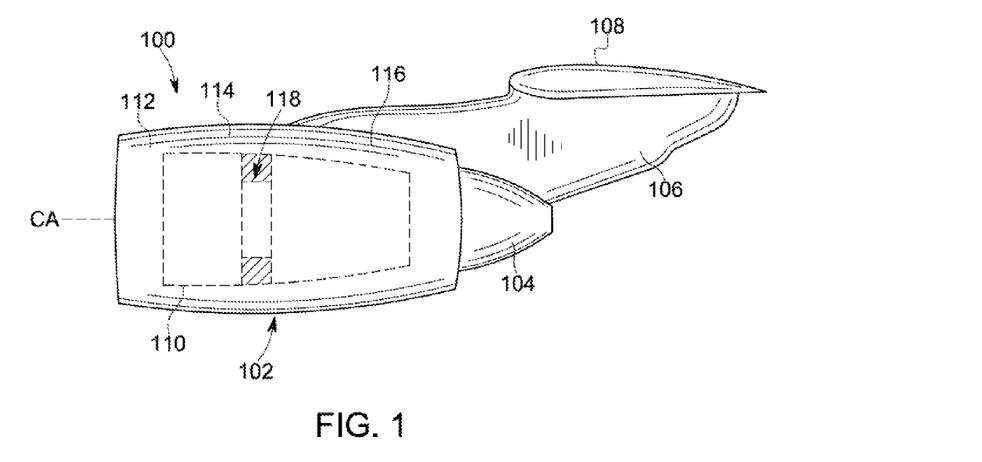
FIG. 1 depicts a side view of an exemplary gas turbine engine in a mounted configuration on an aircraft wing.
Figure 2:
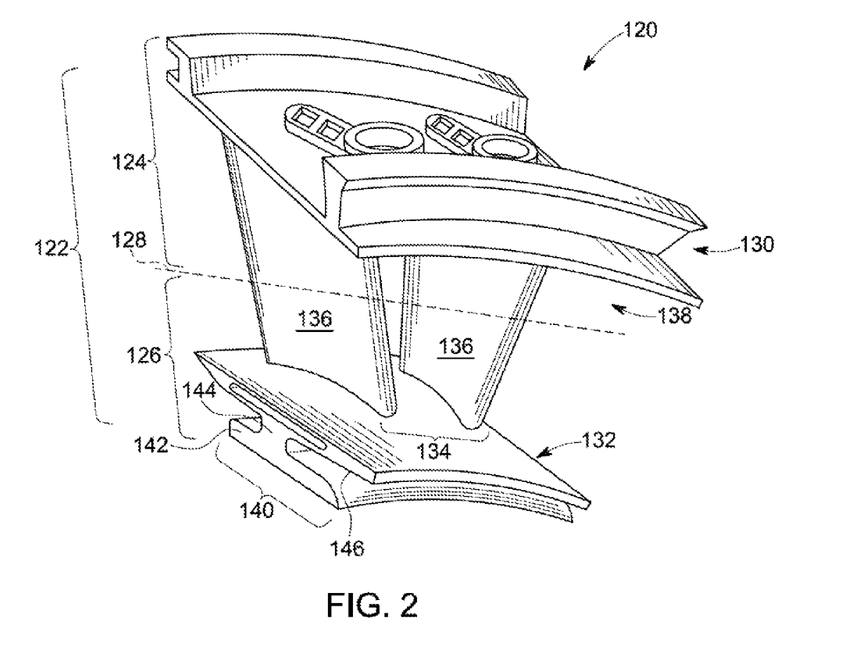
FIG. 2 depicts a perspective view of an exemplary turbine nozzle segment.

Referring to both FIGS. 1 and 2, one implementation of the repairs the inventors contemplate herein applies to aircraft engines. FIG. 1 depicts a schematic of a wing portion 100 of an aircraft that includes a nacelle 102, an exhaust nozzle 104, a pylon 106, and a wing 108. The nacelle 102 functions as an outer casing for a gas turbine engine (also "aircraft engine"), shown in general outline and identified by the numeral 110. The outer casing may comprise an inlet cowl 112, a fan cowl 114, and a thrust reverser 116. Of the many components and features that comprise the turbine engine 110, FIG. 1 focuses on illustrating one of them—a turbine nozzle 118, which is the subject of the following discussion. In one embodiment, the turbine nozzle 118 resides in the turbine section of the engine 110 and forms an annular ring that mounts about a central axis (CA) of the turbine engine 110. This annular ring directs air through the turbine engine 110. Depending on various factors such as, configuration and/or type, etc., the turbine engine 110 may further comprise a plurality of turbine nozzles 118 that are located at predetermined positions axially along the central axis (CA).

FIG. 2 illustrates additional details of an embodiment of the turbine nozzle 118 of FIG. 1. One of these details is an embodiment of a turbine nozzle segment 120. The turbine nozzle segment 120 comprises an integrally-formed body 122 a first portion 124 and a second portion 126 that are delineated by a machining line 128. The first portion 124 comprises an outer band 130 and a portion of a first vane feature 134. The second portion 126 comprises an inner band 132 and another portion of the first vane feature 134. Considering the first portion 124 and the second portion 126 together, as shown in FIG. 2, the body 122 of the turbine nozzle segment 120 comprises the outer band 130, the inner band 132, and the first vane feature 134 disposed therebetween. In one embodiment, the first vane feature 134 comprises one or more vanes 136 that extend between the outer band 130 and the inner band 132. As used herein with reference to the bands 130 and 132, the terms "outer" and "inner" refer to radial regions about the central axis CA (of FIG. 1), with the "outer band 130" having a greater radius than the "inner band 132." The outer band 130, the inner band 132, and the vanes 136 form a path 138 that can direct combustion gases, e.g., to a turbine rotor (not shown) located downstream along the central axis (CA) (FIG. 1). In one embodiment, the inner band 132 has a t-bar segment 140 with a flange section 142 and a web section 144 that extends from a radially inner surface 146 of the inner band 132. Although not shown in FIG. 1, the vanes 136 may have a surface topography with slots, holes, and other features that penetrate the surface of the vanes 136 in various configurations.

The turbine nozzle segment 120 can be integrally cast with techniques that form the outer band 130, the inner band 132, and the first vane feature 134 monolithically. The casting preferably utilizes a high quality superalloy, such as a cobalt or nickel-based superalloy. Certain specifications may further require that the resulting part incorporate a coating with properties for, e.g., corrosion resistance and/or thermal resistance. Gas turbine engines may include a plurality of such turbine nozzle segments 120 arranged circumferentially in an annular configuration, e.g., about the central axis (CA) (FIG. 1). Moreover, while FIG. 2 shows the turbine nozzle segment 120 with two vanes 136, other configurations of the turbine nozzle segment 120 can have any number of vanes 136.

Referring to FIGS. 1 and 2, during operation of the turbine engine 110, gases traversing the turbine engine 110 from an area forward of the turbine nozzle 118 passes over the vanes 136. These gases include hot combustion gases which are corrosive and cause the vanes 136 to crack, corrode, and otherwise degrade. The turbine nozzle segment 120 can likewise experience damage that can result from local gas stream over-temperature or foreign objects impacting thereon.

As mentioned above, portions of the turbine nozzle segment 120 may become damaged to the point where it cannot be repaired by known repair processes. The present disclosure provides methods of repairing the turbine nozzle segment 120 that retains the inner band 132 and discards the outer band 130 and vanes 136. In one embodiment, the methods separate the first portion 124 from the second portion 126 such as along the machining line 128, remove any excess material, and secure a replacement part (not shown) to the inner band 132 so as to permit operation of the turbine nozzles described herein. This method is particular advantageous because the vanes 136 may include internal feature that distribute cooling air to other portions of the turbine nozzle segment 120. The cooling functions may be irreparably damaged or lost dining other repairs, those that do not contemplate aspects of the turbine nozzle segment 120 that accommodate the cooling features. As set forth below, however, embodiments of the method utilize the replacement part, which replicates the necessary cooling features as well as other features (e.g., materials) in order for repair of the turbine nozzle segment 120 to be successful.

Figure 3:
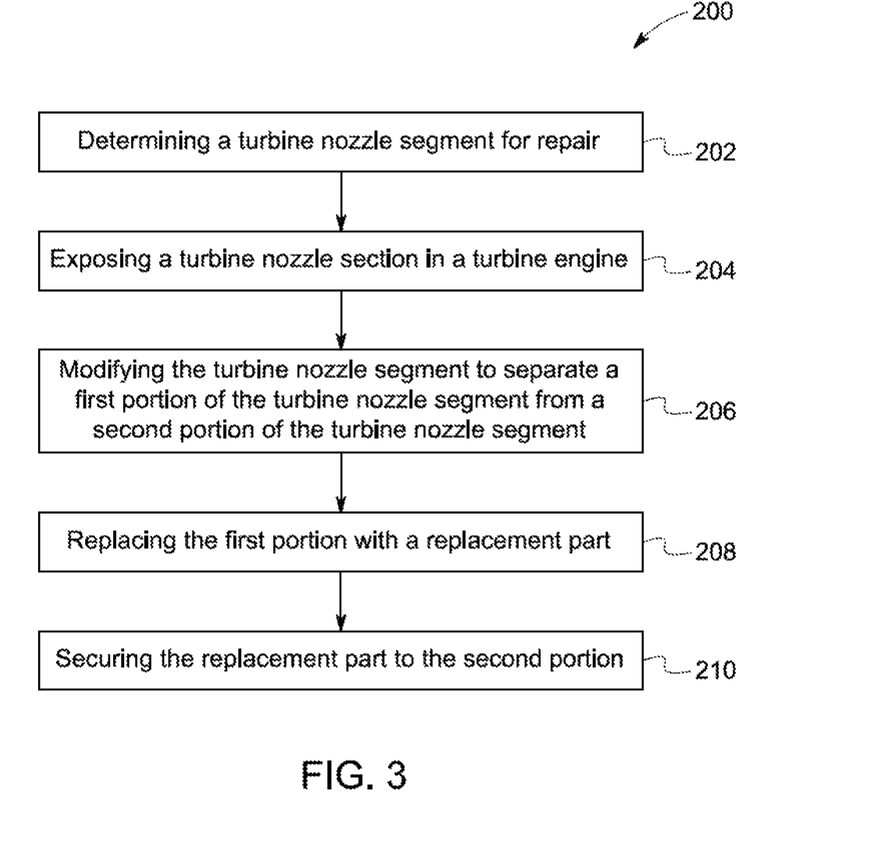
FIG. 3 depicts a flow diagram of an exemplary embodiment of a method for repairing a turbine nozzle segment.

With continuing reference to FIG. 2, FIG. 3 provides a flow diagram of an embodiment of a repair method 200. The method 200 comprises, at block 202, determining a turbine nozzle segment needs repair and, at block 204, exposing the turbine nozzle section in the turbine engine. The method 200 can also comprise, at block 206, modifying the turbine nozzle segment, at block 208, repairing the turbine nozzle by replacing a first portion of the turbine nozzle segment with a replacement part and, at block 210, securing the replacement part to the second portion.

In one embodiment, technicians can use various techniques to diagnose and identify failures in the turbine nozzle sections. Diagnosis may occur during routine maintenance, wherein the turbine nozzle sections may be exposed (e.g., at block 204) before actual diagnosis (e.g., at block 202) occurs. On the other hand, systems may provide automated alarms or other indicators that identify the particular turbine nozzle segment that may need service and repair.

Modifications to the turbine nozzle segment may require various machining and/or processes that change the physical structure of the turbine nozzle segment. This element of the method 200 (e.g., at block 206) separates the first portion 124 from the second portion 128. In one example, the technician discards the first portion 124 (with the outer band 130 and the vanes 136). In one embodiment, the method 200 may include performing one or more secondary operations (e.g., grinding, deburring, cutting, bonding) to prepare the inner band 132 to receive and secure the replacement part, which the disclosure describes in more detail below.

Figure 4:
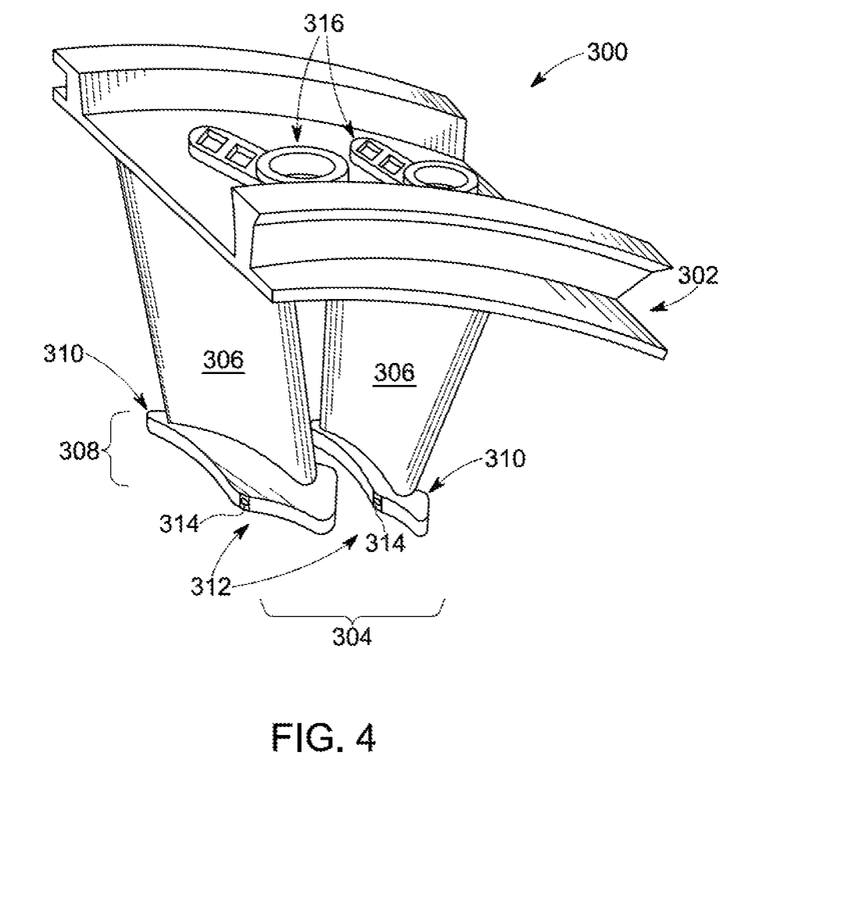
FIG. 4 depicts a perspective view of a replacement part for use in a method of repairing a turbine nozzle segment.

FIG. 4 provides an example of a replacement part 300 for use in embodiments of the repair methods of the present disclosure. The replacement part 300 includes a second outer band 302 and a second vane feature 304 with one or more airfoils 306 (also "vanes 306"). The second vane feature 304 includes a bottom segment 308, where each of the vanes 306 have a base feature 310 with a cooling feature 312 that includes lower cooling holes 314. The second outer band 302 may include corresponding outer cooling holes 316 which receive fluids including liquids and, more commonly, air and other gases common to turbine engines. Although not shown herein, the second outer band 302, the vanes 306, and the base feature 310 may include various configurations of bores, apertures, and other features that direct the fluids between the lower cooling holes 314 and the outer cooling holes 316.

The replacement part 300 replicates the portions of the turbine nozzle segment that is removed. Like the turbine nozzle segment, the replacement part 300 can be cast and/or can otherwise integrate the outer band 302 and the vanes 306 together into a single, monolithic part. This construction can simplify the repair method as well as reduce costs to manufacture the replacement part 300. The base feature 310 can have a form factor that provides sufficient material to incorporate the cooling feature 312. This form factor can have various shapes and, in one construction, the form factor has a non-airfoil shape with a periphery that includes material in excess of the material that the vanes 306 comprise. The periphery have any form factor, depending on turbine and/or engine design specifications. That is, the periphery can outline shapes of varying degrees of uniformity, wherein for example rectangular-type shapes have a high degree of uniformity and random shapes have a low degree of uniformity.

Figure 5:
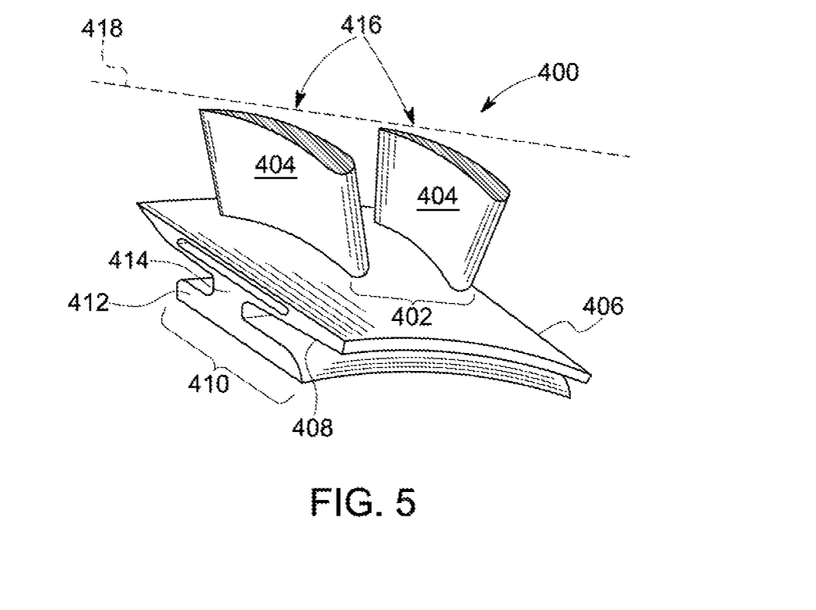
FIG. 5 depicts a perspective view of a turbine nozzle segment subject to a method for repairing a turbine nozzle segment.
Figure 6:
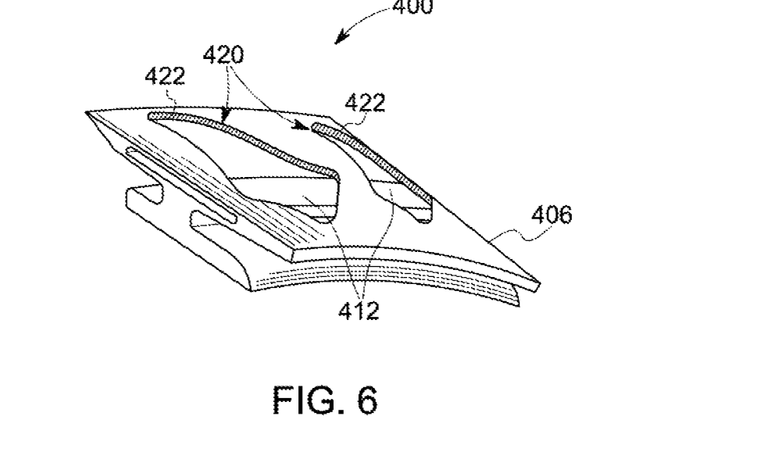
FIG. 6 depicts a perspective view of a turbine nozzle segment subject to a method for repairing a turbine nozzle segment.

FIGS. 5 and 6 illustrate an exemplary inner band 400 that can result from performing all or a portion of one or more of the exemplary methods outlined above. In FIG. 5, the inner band 400 includes a first vane feature 402 with vanes 404 and an inner band member 406 with a radially inner surface 408. The inner band 400 also includes a t-bar segment 410 having a flange section 412 and a web section 414 that extends from the radially inner surface 408. Particular to this example of the inner band 400, the vanes 104 form vane remnants 416, which comprise residual material of the vane 404 that may remain after cutting along a machining line 418.

FIG. 6 illustrates the inner band 400 without the vane remnants 416. More particularly, the inner band 400 includes recesses 420, which extend through the material of the inner band member 406 and expose the top of the web section 412. The recess 420 have a peripheral wall 422 that defines the shape of the recess 420. In one example, the shape corresponds to the shape and configuration of the base feature (e.g., the base feature 310) of the replacement part. This shape permits the recess 420 to receive the base feature and to locate features of the replacement part (e.g., the lower cooling holes 314 (FIG. 4)) relative to the inner band member 406. In one embodiment, the recesses 420 include a non-airfoil shaped recess.

Figure 7:
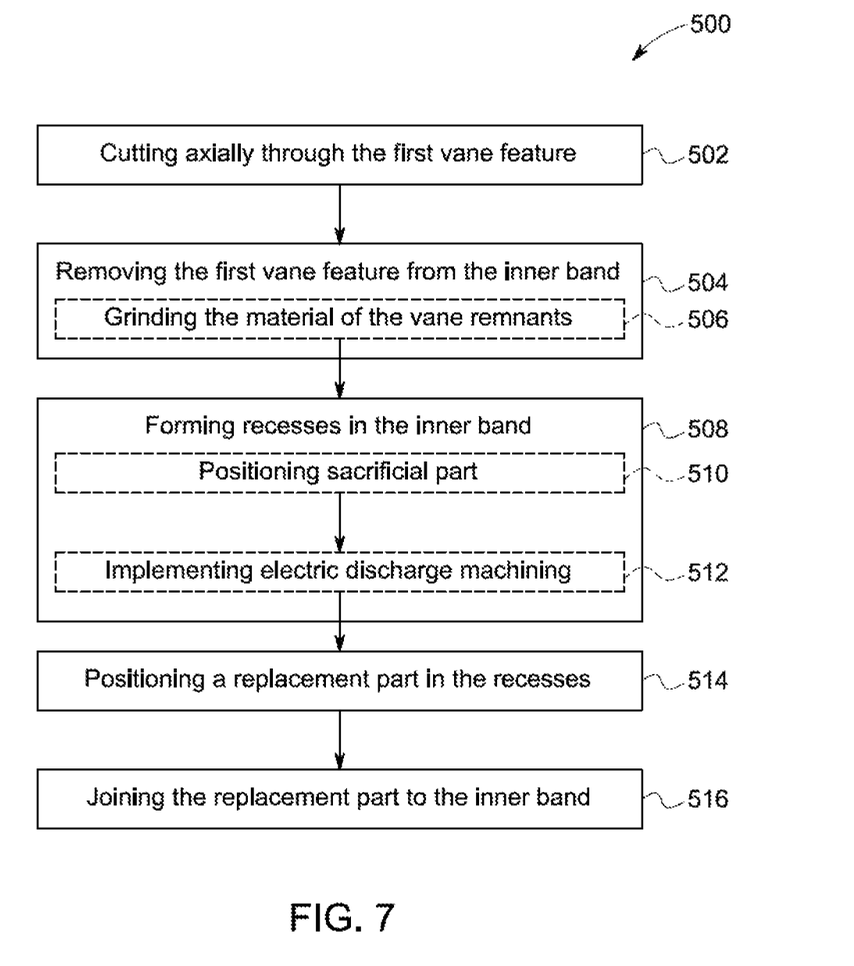
FIG. 7 depicts a flow diagram of an exemplary embodiment of a method for repairing a turbine nozzle segment.

Referring next to FIG. 7, and also to FIGS. 4-6, another example of a repair method 500 is illustrated. As mentioned above, examples of the repair methods, including repair method 500, remove the outer band and the vanes from the turbine nozzle segment and replace each of these components with a suitably configured replacement part 300. To accommodate for a form factor of the base feature 310 and to integrate the base feature 310 with the inner band 400, however, the method 500 may also include modifying the inner band 400 so as to receive the base feature 310 and/or to position the lower cooling holes 314 in position to direct cooling air below the inner band member 406 and into the gap formed between the inner band member 406 and the flange section 412.

In one embodiment, the method 500 includes, at block 502, cutting axially through the first vane feature 402 (e.g., along the machining line 418). The method 500 also includes, at block 504, removing the first vane feature 402 from the inner band 400. The method 500 may include, at block 506, grinding the vane remnants 416 from the inner band 400 and/or, in one example, applying other suitable techniques to clean and remove material from the upper flange member 406. The method 500 further include, at block 508, forming the recesses 420, which may include, at block 510, positioning a sacrificial guard and, at block 512, implementing electric discharge machining ("EDM") processes to remove material of the inner band member 406. The method 500 still further includes, at block 514, positioning a replacement part in the recesses 420 of the inner band 400 and, at block 516, joining the replacement part to the inner band 400.

Embodiments of the method 500 may utilize a plunge EDM process in which tooling for the EDM process enters the inner band member 406 from the top or, in other words, opposite the radially inner surface 408. The tooling may plunge to a prescribed depth to remove material of the inner band member 406 and form the recesses 420. In one embodiment, the tooling has a shape that corresponds to the shape and form factor of the base feature 310 of the vanes 306. Dimensions for the tooling shape (and the recesses 420 that result therefrom) permit effective bonding of the replacement part 300 and the inner band 400.

Bonding may occur by brazing, welding, and or other suitable bonding technique. For applications such as aircraft and other turbine engines, which expose the turbine nozzle segment to high thermal gradients, brazing is generally preferred. Examples of the method 500 prescribe bonding along the peripheral edge of the base feature 310 (of the replacement part 300) and the inner band member 406. In one example, the bonding operation includes applying one or more tack welds around the base feature 310 and applying the final brazing material/structure.

In some cases, one or more aspects of the embodiments of the repair methods 200 and 500 will be performed on a fully assembled turbine engine, so equipment for cutting operations in such cases will conform to that purpose. Examples of cutting operations that can be used on a fully assembled turbine engine can use an abrasive cutting wheel, a laser, etc. In other example, cutting can be done using non-conventional means such as EDM processes discussed above. After separation, the unsalvageable structure may be scraped.

In one embodiment, the method 500 may also include stripping any coating materials (such as corrosion or thermal resistant coatings) that may be present. The coating material may be stripped using any suitable technique, such as grit blasting, chemical baths, and the like, or by a combination of such techniques. The method 500 may also include repairing cracks in the inner band 400 as well as other repair procedures that, e.g., may improve the integrity of the inner band 400. Such repairs can be performed using known repair techniques including those such as alloy brazing, alloy build up, welding and the like. These conventional repairs will be carried out as needed depending on the condition of the inner band 400.

Figure 8:
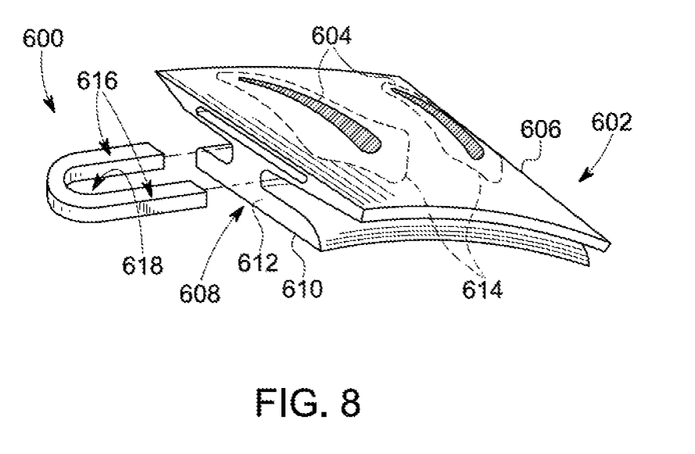
FIG. 8 depicts an example of a sacrificial part for use in a method for repairing a turbine nozzle segment.

FIG. 8 illustrates an example of a sacrificial guard 600 for use in the method 500. The sacrificial guard 600 is shown in its uninstalled configuration relative to, e.g., an example of an inner band 602. The inner band 602 comprises vane remnants 604, an inner band member 606, and a t-bar section 608 with a flange section 610 and a web section 612. Surrounding the vane remnants 604 are the outlines of recess 614, which the technician can form using, e.g., the plunge EDM process discussed above.

The sacrificial guard 600 comprises a pair of elongated legs 616 that form a slot 618. The sacrificial guard 600 protects the structure of the t-bar segment 606. More particularly, the sacrificial guard 600 may prevent removal of material from the inner band 602 and, in one implementation, the sacrificial guard 600 protects the web section 612 as the vane remnants 604 are removed and the EDM process forms the recesses 614 in the inner band 400. In one example, the sacrificial guard 600 comprises a non-conductive material that interrupts the EDM process. While this disclosure contemplates any number of configurations of the sacrificial guard 600, The slot 614 is sized and configured so that the sacrificial guard 600 can surround the web section 612 when the sacrificial guard 600 is in position into the gap between the inner band member 606 and the flange section 610. Each of the elongated legs 610 can extend into the gap, and in one example the elongated legs 610 extend substantially through the inner band 602 so as to project out or near the side opposite the point of insertion. This configuration may restrict the depth the tooling for the EDM process will effectively remove material.

Figure 9:
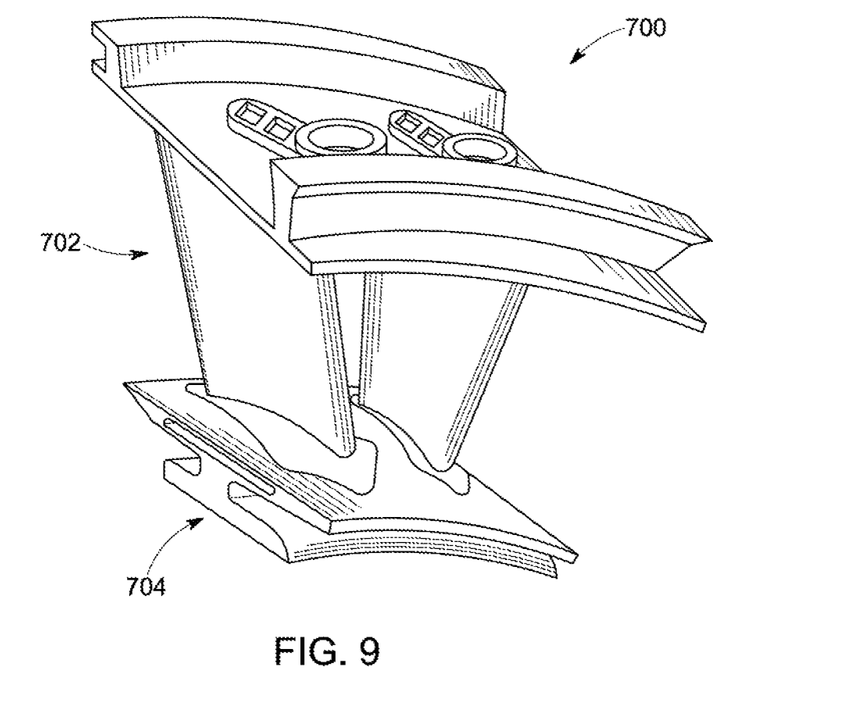
FIG. 9 depicts a repaired turbine nozzle segment resulting from a method for repairing a turbine nozzle segment.

FIG. 9 depicts an example of a repaired turbine nozzle segment 700, which may result from performing one or more steps (or combinations thereof) of the exemplary methods 200 and 500. The repaired turbine nozzle segment 700 comprises a replacement part 702 and an inner band 704. In one embodiment, the replacement part 702 comprises the same material as the inner band 704 to produce a repaired turbine nozzle segment 700 that retains the material properties of the original nozzle segment (e.g., turbine nozzle segment 120). However, in other embodiments, the replacement casting 702 comprises different material such as in one example an alloy having enhanced material properties. Differences in the constituent materials may arise during the service life of a gas turbine engine component such as the turbine nozzle segment, where improvements made to alloys become suitable for use with such components are developed. Traditionally, technicians would have to replace existing components with new components fabricated from the improved alloy to realize the enhanced material properties. However, by fabricating the replacement casting 602 from the improved alloy, the repaired nozzle segment 700 will obtain, in part, the enhanced material properties.

The replacement casting 700 may also have modified design features compared to the original nozzle segment. Such features may arise during the service life of a turbine engine component such as the turbine nozzle segment, where designs improve and features of the component may change. The turbine nozzle segment may comprise a first design having particular aerodynamic, thermodynamic, and mechanical aspects. For example, the vanes may have a first airfoil definition which incorporates particular dimensional arrangements of e.g., the leading and trailing edges of the vanes. The replacement casting 702 may incorporate changes to the design of the vanes, where the vanes have a second airfoil definition that incorporates certain improvements to enhance performance. Accordingly, implementation of the repair methods resulting in the repaired turbine nozzle segment 600 that obtains the benefit of the design improvements without having to replace the entire turbine nozzle segment.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. In a turbine engine, a method comprising:
repairing a turbine nozzle by replacing a first portion of a turbine nozzle segment with a replacement part comprising an outer band and a vane integrally formed with the outer band,
wherein the vane comprises a bottom segment with a lower cooling hole that directs fluid to a position that is radially interior to a radially inner surface of a second portion of the turbine nozzle segment;
removing a vane of the turbine nozzle;
forming a recess in the second portion, wherein the recess is sized and configured to receive the bottom segment therein; and
positioning a sacrificial part and performing a plunge electrical discharge machining process,
wherein the sacrificial part has material properties that limits penetration of tooling for the plunge electrical discharge machining process into the second portion of the turbine nozzle, and
wherein the sacrificial part comprises a non-conductive material.

2. A method according to claim 1, wherein the second portion comprises a T-bar segment secured thereto.

3. A method according to claim 1, wherein the bottom segment and the recess each comprises a non-airfoil shape.

4. A method according to claim 1, further comprising securing the bottom segment to the second portion.

* * * * *

UNITED STATES PATENT AND TRADEMARK OFFICE
CERTIFICATE OF CORRECTION

PATENT NO. : 9,447,689 B2
APPLICATION NO. : 13/163474
DATED : September 20, 2016
INVENTOR(S) : Brown et al.

It is certified that error appears in the above-identified patent and that said Letters Patent is hereby corrected as shown below:

In the Specification

In Column 4, Line 1, delete "dining other repairs," and insert -- during other repairs, i.e., --, therefor.

In Column 4, Line 30, delete "second portion 128." and insert -- second portion 126. --, therefor.

In Column 5, Line 12, delete "vanes 104" and insert -- vanes 404 --, therefor.

In Column 5, Lines 19-20, delete "web section 412." and insert -- web section 414. --, therefor.

In Column 6, Line 56, delete "600, The slot 614" and insert -- 600. The slot 618 --, therefor.

In Column 6, Line 60, delete "elongated legs 610" and insert -- elongated legs 616 --, therefor.

In Column 6, Line 61, delete "elongated legs 610" and insert -- elongated legs 616 --, therefor.

In Column 7, Lines 18-19, delete "replacement casting 602" and insert -- replacement casting 702 --, therefor.

In Column 7, Line 22, delete "casting 700" and insert -- casting 702 --, therefor.

In Column 7, Lines 36-37, delete "turbine nozzle segment 600" and insert -- turbine nozzle segment 700 --, therefor.

Signed and Sealed this
Third Day of January, 2017

Michelle K. Lee
*Director of the United States Patent and Trademark Office*